INSULATING PROTECTOR FOR CLIPS USED IN ELECTRICAL CONNECTIONS

Original Filed May 24, 1967 4 Sheets-Sheet 1

INVENTOR.
Roger Poingt
BY
Pierce, Scheffler & Parker
ATTORNEYS

INSULATING PROTECTOR FOR CLIPS USED IN ELECTRICAL CONNECTIONS

Original Filed May 24, 1967 4 Sheets-Sheet 2

INVENTOR
Roger Poingt
BY Pierce, Scheffler & Parker
ATTORNEYS

INSULATING PROTECTOR FOR CLIPS USED IN ELECTRICAL CONNECTIONS

Original Filed May 24, 1967 4 Sheets-Sheet 3

INVENTOR
Roger Poingt
BY Pierce, Scheffler & Parker
ATTORNEYS

INSULATING PROTECTOR FOR CLIPS USED IN ELECTRICAL CONNECTIONS

Original Filed May 24, 1967 4 Sheets-Sheet 4

INVENTOR

Roger Poingt

BY Pierce, Scheffler & Parker

ATTORNEYS

United States Patent Office

Re. 28,126
Reissued Aug. 20, 1974

28,126

INSULATING PROTECTOR FOR CLIPS USED IN ELECTRICAL CONNECTIONS

Roger Poingt, Vincennes, France, assignor to Etablissements Proner, S.A., Montreuil, Seine-Saint-Denis, France Original No. 3,517,370, dated June 23, 1970, Ser. No. 640,950, May 24, 1967. Application for reissue May 23, 1973, Ser. No. 364,014
Claims priority, application France, May 27, 1966, 63,251; May 10, 1967, 105,886
Int. Cl. H01r *11/28, 13/48*
U.S. Cl. 339—59 R 3 Claims

Matter enclosed in heavy brackets [ ] appears in the original patent but forms no part of this reissue specification; matter printed in italics indicates the additions made by reissue.

ABSTRACT OF THE DISCLOSURE

An insulating protector for a clip to be used for electrical connections is comprised of a sheath made from insulating material such as a molded plastic. The sheath is open at both ends, the front end of the sheath being provided with an upturned flange establishing a positive stop for the front end of the clip when inserted from the rear end of the sheath, and the sheath being also provided on one of its inner surfaces with a catch member in the form of a wedge or tongue which moves automatically into a locking engagement with a part of the clip after the clip has been fully inserted in the sheath thus preventing any backward movement of the clip.

The present invention concerns an improvement in insulating protectors for clips used in electrical connections.

At the present time, clips are being made which are designed to be inserted onto a corresponding male element. The clips are of various forms but possess, in general, points in common which consist in the fact that, in the majority of cases, the electric wire is set or soldered in the clip, which has for this purpose an extremity with two or four small flaps bent back in a vertical position, the two which are slightly longer are then pressed down and fastened onto the insulating sheath of the electric wire to ensure sufficient resistance to being pulled off, whereas, the other two are set on the bare part of the electric wire so as to ensure the electrical contact. The free extremity, which represents the clip, properly speaking, comprises edges which are bent back in a suitable form to hold the clip on a round or flat male plug.

It is frequently necessary to cover the clip with a sheath, which serves as insulation and protection. It is designed to cover the entire clip with, in general, extra length in the rear so as to protect the clip, which transmits the electric current, against any outside contact.

In other assemblies, the clips are used in insulating cases, where they are mounted as a pair or in a group of several pairs, in order to hold them in a predetermined sequence. In addition to serving as insulating protection, the sheath plays, therefore, the role of positioning the various clips with respect to each other. The clips, consequently, remain fastened to the interior of the sheath, and the whole unit is connected by an assembly of corresponding plugs.

When it is a question of a sheath for a single clip, several designs are known. For example, a molded sheath with a wide extremity designed to cover part of the electric wire is threaded onto the wire before the connection is made, and then put in place afterwards. Elastic sheaths of small diameter are also used, which are enlarged by means of pincers to force them over the connections once these have been completed. And, finally, tubes which contract under heat are known, and which have an initial diameter that is sufficiently large to be threaded on the completed connection and contracts afterwards under the action of heat.

This brief description of the known sheath already makes apparent the difficulties of assembly and the time losses caused by this.

The present invention has as its purpose the elimination of these disadvantages and it has as its object an insulating sheath for clips used in electrical connections, characterized by the fact that it consists of a molded member made of an insulating material such as plastic containing one or more cavities which are terminated at the extremity opposite to the opening for the introduction of the clips by a flange which prevents the clip from leaving the cavity while permitting the introduction of contact plugs into the clips, one of the inner surfaces of the cavity having a projecting member in the form of an oblique tongue or wedge forming a catch for the clip, the catch being forced aside relatively to the clip when the clip is introduced into the sheath but establishing a locking engagement with the clip after it has been fully inserted, thereby blocking any movement backward of the clip out of the sheath.

Other characteristics also become apparent from the description which follows, and which is given merely by way of example:

In order to facilitate an understanding of this description, the following has been shown on the drawings attached herewith:

Figure 1:
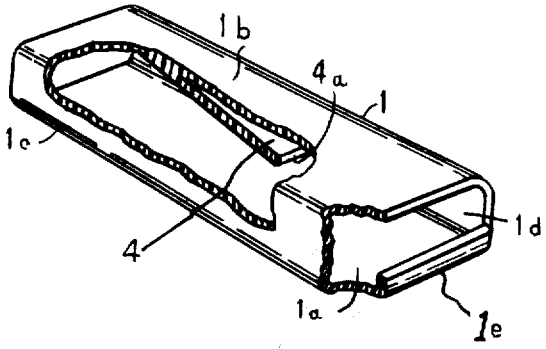
FIG. 1 is a diagrammatic view in perspective with partial sections of a sheath according to one form of embodiment, the clip not being included.
Figure 2:
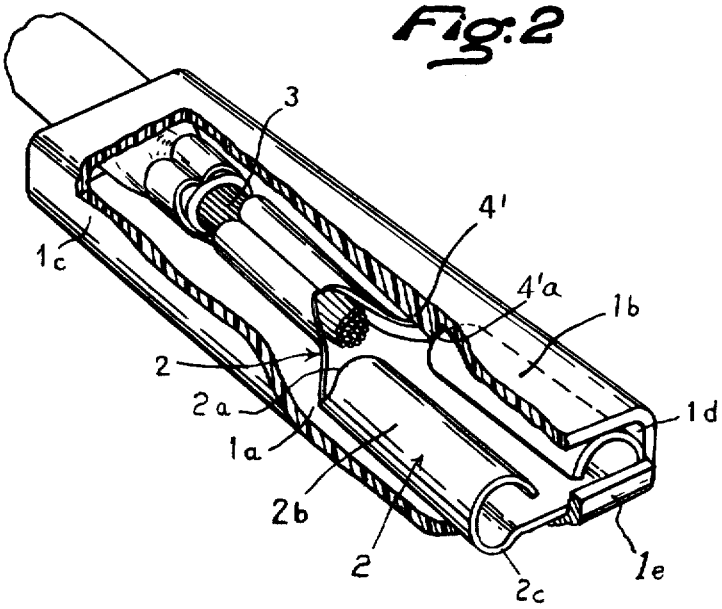
FIG. 2 is a diagrammatic view in perspective with partial sections of a sheath according to a second form of embodiment and with the clip in place with the sheath.

With reference now to the drawings, and to FIG. 1 in particular, it will be seen that the insulating enclosing sheath structure for the electrical connection clip is comprised of an elongated essentially rectangularly shaped tubular member 1 made of a yieldable plastic material and having a bottom wall 1a, top wall 1b and side walls 1c and 1d. The opposite ends of the sheath are open, the rear end being entirely open to permit insertion of a clip 2 of the type as shown in FIG. 2, and the front end including a short flange 1e upturned from the bottom wall 1a. Clip 2 is essentially a rigid structure as related to the sheath 1 and in the sense that it has no yieldable lang structure which characterizes some presently known clip structure to enable them to be retained within their protective sheaths. This flange 1e at the front end of sheath 1 serves to provide a stop for the forward end of the clip 2, a contact plug 3 being inserted into the opposite end of the clip, as indicated in FIG. 2.

To retain the clip 2 in place, once it has been inserted into the sheath, it will be seen that the top wall 1b is provided on its inner surface with an obliquely extending tongue 4 which is formed as an integral part of the molded sheath 1. The downwardly oblique slope of tongue 4 is towards the front, flanged end of the sheath and yields in the direction of the top wall 1b as the clip 2 is inserted from the rear. As soon as the rear edge 2a of the larger part 2b of the clip passes the front edge 4a of the tongue, the latter part is then free to restore itself to its oblique position thus establishing the tongue edge 4a as a catch which prevents the clip from being drawn rearwardly from the sheath. The parts are so dimensioned that when the catch 4 is locked in place behind the edge of the clip, the front end 2c of the clip will abut the flange 1e.

In the somewhat modified embodiment according to FIG. 2, the catch for retaining the clip in place within the sheath is seen to be constituted by a wedge 4' formed as an integral part of the undersurface of the top wall 1b. Since the walls 1a, 1b, of the sheath are somewhat elastic this characteristic being due to the fact that as seen from FIG. 2, such walls are elongated in transverse section and are relatively thin, essentially the entire upper wall 1b gives i.e. bulges in an outwardly direction as the clip 2 is inserted and the larger or thicker part 2b of the clip engages and moves along the inclined surface of the wedge. Once the front end of the clip 2 reaches into a stop engagement with flange 1e, the top wall restores itself to its undistorted state and the front end 4'a of the wedge 4' establishes a shoulder which becomes lodged in place behind the rear edge 2a of the larger part 2b of the clip.

Figure 3:
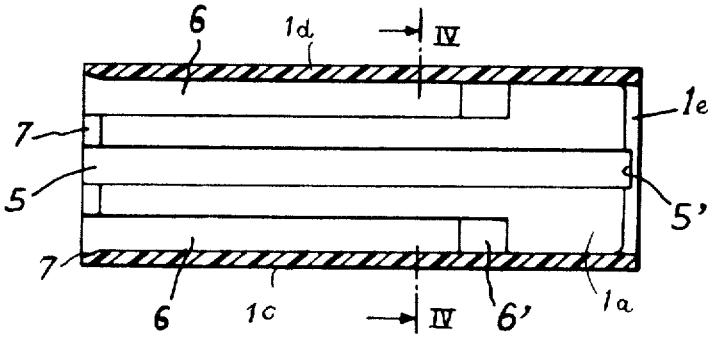
FIG. 3 is a longitudinal section through a modified embodiment of a sheath according to the invention similar to that of FIG. 2 but wherein the bottom wall of the sheath with which the upturned stop flange for the clip is associated is provided with longitudinally extending grooves.
Figure 4:
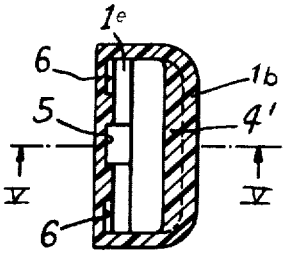
FIG. 4 is a transverse sectional view taken on line IV—IV of FIG. 3.
Figure 5:
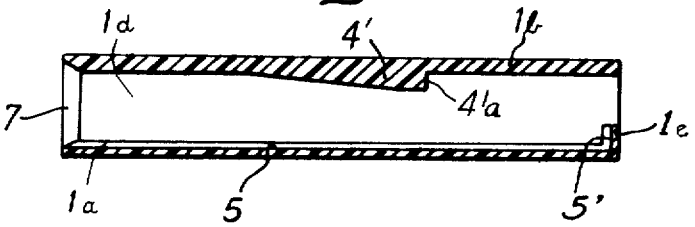
FIG. 5 is a longitudinal vertical section on line V—V of FIG. 4.
Figure 6:
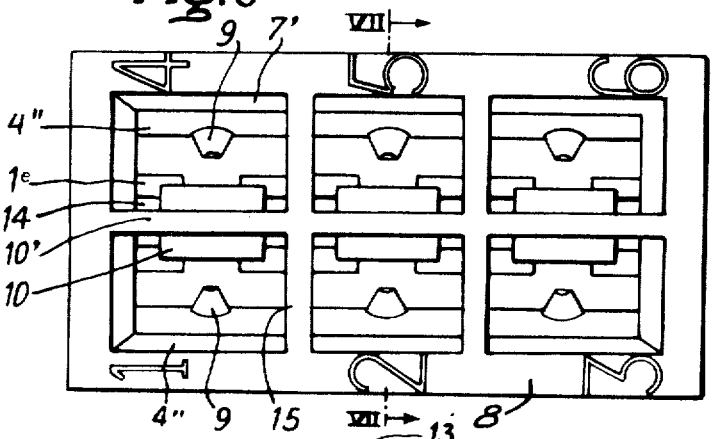
FIG. 6 is a top plan view of another embodiment of the invention featuring a plurality of cavities in the insulating sheath to receive a plurality of clips.
Figure 7:
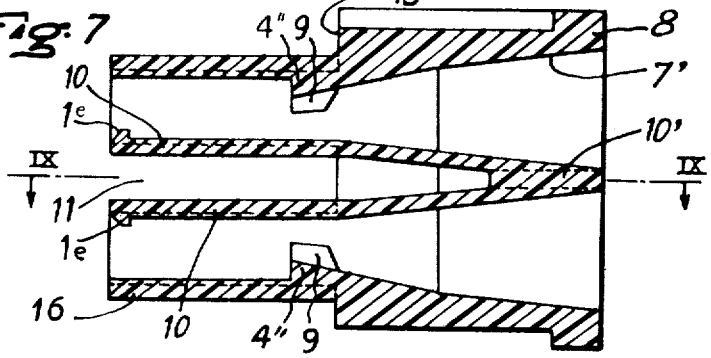
FIG. 7 is a transverse sectional view on line VII—VII of FIG. 6.
Figure 9:
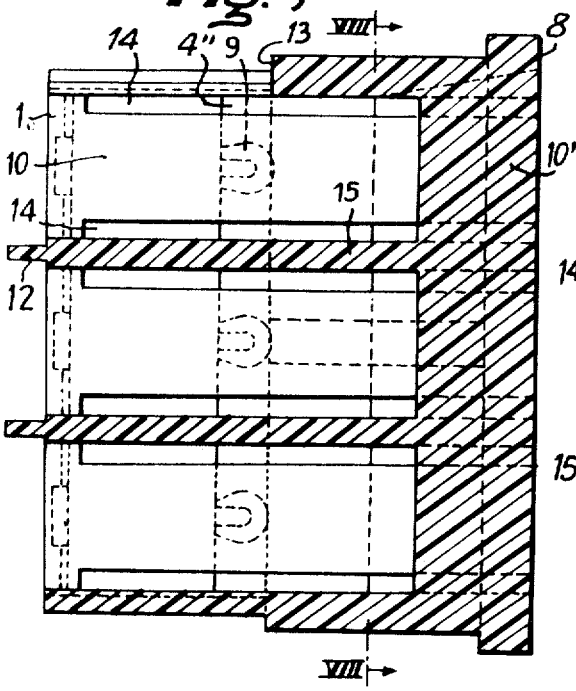
FIG. 9 is a section taken on line IX—IX of FIG. 7.
Figure 8:
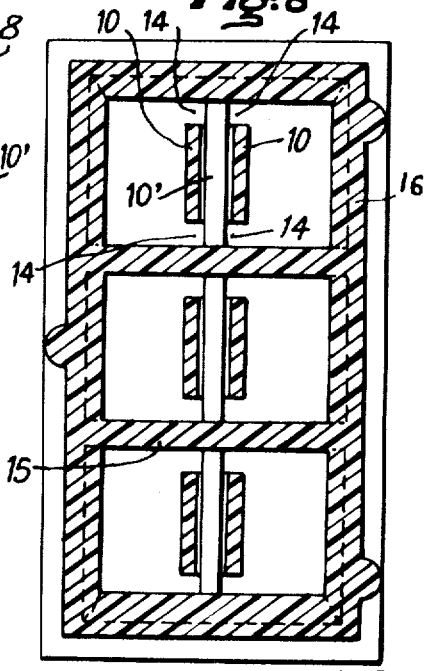
FIG. 8 is a longitudinal section on line VIII—VIII of FIG. 9.

The embodiment of the invention illustrated by FIGS. 3–5, is a modification of the embodiment shown in FIG. 2, and hence, corresponding parts of the structure shown in these views have been given the same reference numerals. The inner surface of the bottom wall 1a of the sheath in the embodiment of FIG. 2, is entirely plane. In the modified embodiment of FIGS. 3–5, the bottom wall is provided with three longitudinally extending parallel grooves, there being a centrally located groove 5 which extends from the rear end of the sheath all the way up to and half way through the thickness of the flange 1e, thus forming a notch 5' at this point in the flange, and two side grooves 6 the outer edges of which coincide with the side walls 1c, 1d of the sheath. The two side grooves 6 extend only partially along the bottom wall 1a, i.e. for a distance of about two-thirds the length of the sheath, and terminate in blunt faces 6'. The depth of the three grooves 5 and 6 amount to about one-third the thickness of the bottom wall 1a of the sheath, and these grooves are provided to permit passage of certain protuberances which are normally found on the back of the clips and in front of the center. These clips are not illustrated. In order to facilitate introduction of the clips, the entrance end to the cavity within the sheath is preferably chamfered as at 7 on all four walls.

The embodiment illustrated in FIGS. 6–9 provides a plurality of cavities within the sheath for receiving a plurality of clips. In this embodiment, the insulating sheath which is likewise a molded product of plastic material contains six cavities arranged in two parallel rows of three each, the individual cavities in the rows being located in side-by-side relation along their shorter sides which thus form common walls 15 between adjacent cavities. Two superimposed cavities contain elastic walls 10 separated from each other by a space 11 over three-quarters of their length, but have a section 10' in common on the side where the clips, not illustrated, are introduced into the cavities. The walls 10 are, moreover, separated from the lateral surfaces 15 by the slits 14 and are connected to the other walls of the sheath by the stop flanges 1e and the section in common 10'. The wedge-shaped catches 4'' are provided on the outer walls 16 which are rigid, and they support the conical projections 9 in the center. When the clips are introduced into the cavities, the walls 10 opposite the catches 4'' will yield and move back so as to allow the clips to pass through, each clip being held between the wedge-shaped catch 4'' and the flange 1e. The entrance 7' to the cavities is conically shaped to facilitate introduction of the clips, and the conical section 7' of the cavity corresponds to substantially one-half of their total length. The connection between the two sections is made by a step 13 which serves at the same time as a stop shoulder when the sheath assembly is to be sunk in a wall, for example. The surface 8 of the sheath at the entrance end of the clips is made sufficiently wide so as to permit numerical indicia to be inscribed upon it. At the opposite end of the sheath, partitions 12 which have low height are provided, forming a prolongation of the walls 15 and which are designed to separate the plugs entering the several cavities.

Figure 10:
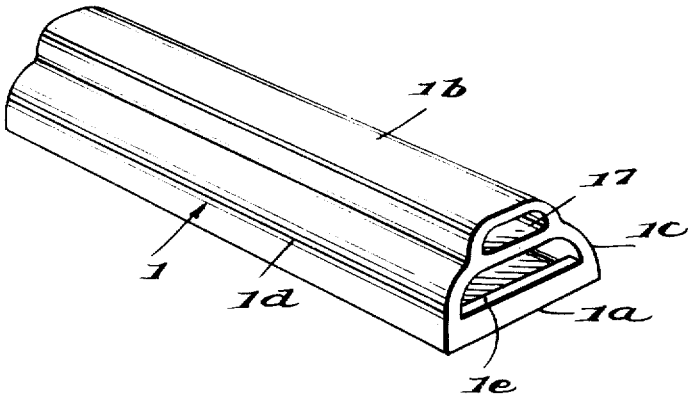
FIG. 10 is a diagrammatic view in perspective of a sheath according to a modified embodiment featuring a cavity on top of the insulating sheath to receive a paper strip with indicia identifying the sheath.
Figure 11:
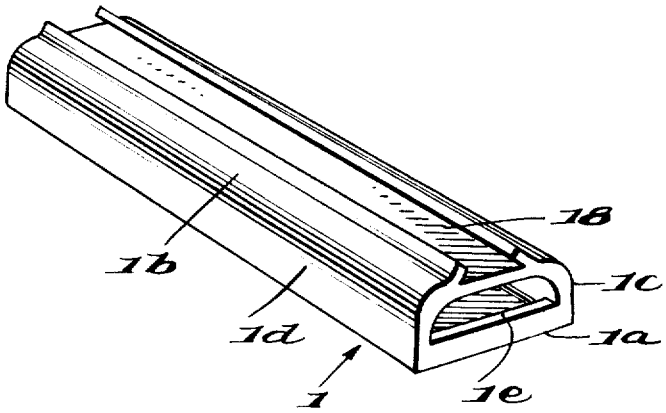
FIG. 11 is a diagrammatic view in perspective of a sheath according to another modified embodiment featuring slides in the form of longitudinally extending grooves on top of the insulating sheath to receive a paper strip with indicia identifying the sheath.

The embodiments illustrated in FIGS. 10, 11 provide means to identify easily the connections. In the case of FIG. 10 there is a rather flat cavity 17 on top of the upper wall 1b of the sheath extending longitudinally the entire length of the sheath. It is molded together with the sheath in transparent plastic. In yet another embodiment illustrated FIG. 11 slides 18 are provided in the form of longitudinally extending grooves, on top of the upper wall 1b of the sheath. The cavity 17 or the grooves 18 receives a paper strip not illustrated having indicia identifying the sheath.

It is obvious that these cavities 17 or slides 18 can be provided in a similar manner on the upper and lower outer walls 16 without departing from the spirit and scope of the invention.

In conclusion, it will be understood that while several embodiments of the invention have been described and illustrated, various modifications may be made therein without, however, departing from the spirit and scope of the inventive concept.

I claim:

1. In an insulated clip structure to be used in electrical connections, the combination comprising a sheath of resilient plastic insulating material defining a clip receiving cavity, *said sheath having a rectangular configuration elongated in transverse sections consisting of relatively broad imperforate top and bottom walls joined by relatively narrow imperforate side walls thereby to render said sheath elastically yieldable in a direction perpendicular to the surfaces of said top and bottom walls,* a clip member which is essentially rigid as related to said sheath, said clip member being provided with a shoulder intermediate the ends thereof, said sheath being open at both ends, the front end of said sheath being provided with a flange serving as a stop for the corresponding end of said clip, [said sheath further including a pair of oppositely disposed side walls], *the internal surface of* one of said *top and bottom* walls being provided with [an internal] *a* catch member in the form of a *non-yieldable* wedge, [and at least one of said walls being elongated in transverse section and so sized and shaped as to enable it to yield elastically in a transverse direction] thereby to, cause said [opposite] *top and bottom walls* to be temporarily forced apart in a transverse direction as said clip following insertion into said sheath from the rear end engages and moves along said wedge, the front end of said wedge establishing a shoulder which is forced to position itself behind and engage said intermediate shoulder of said clip as said clip shoulder passes by said wedge shoulder and said [elastically yieldable] *top and bottom*

*walls* [wall moves] *move* back toward [said other wall] *each other,* said engaged shoulders of said sheath and clip together with an engagement between the front end of said clip and said stop flange serving to prevent said clip from any longitudinal movement in either direction within said sheath.

[2. An insulating protector as defined in claim 1 wherein said wedge which serves as the catch member is located on the yieldable wall of said sheath.]

3. An insulating protector as defined in claim 2 wherein the inner surface of the wall of said sheath opposite said wedge is provided with three parallel and longitudinally extending grooves, the center one of said grooves extending from the rear end of said sheath to about one-half the thickness of said upturned flange from the front end of said sheath, and the other two grooves located respectively adjacent two other opposite walls of said sheath extending from the rear end of said sheath to about two-thirds of its length, the depth of said grooves being about one-third the thickness of said wall in which they are located.

4. An insulating protector as defined in claim 3 wherein the rear end of said sheath is chamfered to facilitate introduction of said clip.

References Cited

The following references, cited by the Examiner, are of record in the patented file of this patent or the original patent.

UNITED STATES PATENTS

| | | | |
|---|---|---|---|
| D. 130,589 | 12/1941 | Goodwin | 339—62 X |
| 2,318,648 | 5/1943 | Penfold | 339—205 |
| 2,675,529 | 4/1954 | Klumpp | 339—62 |
| 2,682,038 | 6/1954 | Johnson | 339—213 X |
| 2,703,395 | 3/1955 | Long | 339—205 |
| 3,012,159 | 12/1961 | Druesedow | 339—217 X |
| 3,201,747 | 8/1965 | Blanchet | 339—113 X |
| 3,263,205 | 7/1966 | Chandler | 339—205 X |
| 3,310,772 | 3/1967 | Kirk et al. | 339—217 |
| 3,351,894 | 11/1967 | Kinkaid | 339—217 |
| 3,430,185 | 2/1969 | Sitzler et al. | 339—217 S |

FOREIGN PATENTS

| | | | |
|---|---|---|---|
| 1,058,278 | 2/1967 | Great Britain | 339—59 M |

RICHARD E. MOORE, Primary Examiner

U.S. Cl. X.R.

339—217 R, 258 SP